Jan. 3, 1967 H. L. THOM 3,296,007
THERMAL BLENDER AND METHOD FOR PREPARING
VISCOUS FLUENT MATERIALS
Filed July 26, 1962 2 Sheets-Sheet 1

Howard L. Thom
INVENTOR.

BY Clarence A. O'Brien
and Harvey B. Jacobson
Attorneys

Jan. 3, 1967  H. L. THOM  3,296,007
THERMAL BLENDER AND METHOD FOR PREPARING
VISCOUS FLUENT MATERIALS
Filed July 26, 1962  2 Sheets-Sheet 2
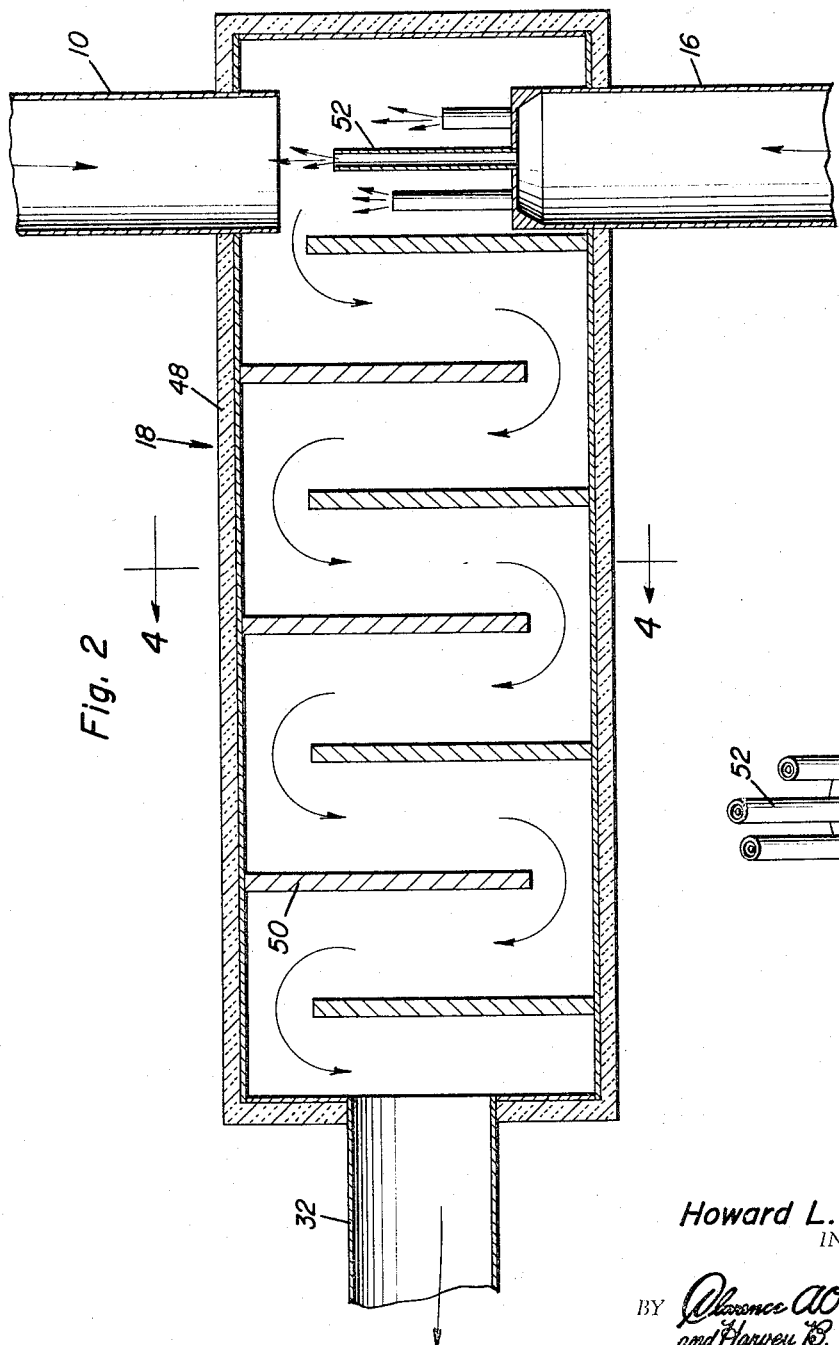
Howard L. Thom
INVENTOR.

United States Patent Office 3,296,007
Patented Jan. 3, 1967

3,296,007
THERMAL BLENDER AND METHOD FOR PREPARING VISCOUS FLUENT MATERIALS
Howard L. Thom, Rte. 1, Laurel, Mont. 59044
Filed July 26, 1962, Ser. No. 212,533
9 Claims. (Cl. 106—278)

This invention relates to the preparation of mixtures or blends of viscous material to produce specified viscosity properties and other characteristics in connection with such products as asphalt cement, liquid asphalt and other bituminous compositions, fuel oils, road oils, etc.

In connection with the preparation of products such as those mentioned above, it is often necessary to prepare mixtures having specified ratios of ingredients so as to produce a product having the requisite viscosity and curing properties under certain temperature conditions. For example, liquid asphalt preparations having specified proportions of asphalt residue and "cutback," in the form of a hydrocarbon solvent, are utilized in connection with road paving and surfacing, the fluent asphalt preparation for such purposes having therefore been graded in accordance with the type or curing rate involved and the range of viscosity within which it falls. Heretofore, various methods have been utilized for obtaining the proper and desired proportions of asphalt residue and solvent or asphalt cutback in connection with a specified type and grade, utilizing expensive equipment for metering the flow of the asphalt and the cutback. It is therefore the primary object of the present invention to provide a new and useful method or process in connection with the preparation of such fluent mixtures based upon temperature observation for the purpose of controlling the flow of either ingredient requiring a pre-calibration of temperature relationship between the inlet temperature of the ingredients and the discharge temperature of the product.

The method of the present invention and associated apparatus, differs from liquid temperature blending systems heretofore available wherein the inlet flow of two or more ingredients are controlled in accordance with the respective inflow temperatures of both ingredients in order to obtain a desired temperature at the discharge end of the blender. The ingredients in accordance with the principles of the present invention are not only introduced at different temperatures with different viscosity properties, it being the purpose of the present invention to obtain a final mixture product or blend having a specified viscosity range under conditions to be used by controlling the flow rate of only one of the ingredients. Also, rather than metering the flow of both inlet ingredients, the method of the present invention is restricted to controlling the flow of only one of two ingredients in order to obtain a calibrated relationship between the discharge temperature and the inlet temperature of the two ingredients. Not only may the desired grade and type of product be obtained by practice of the present invention in a most rapid manner, but a significant economy in the necessary equipment or apparatus will be effected. In connection with bituminous materials, involving for example an asphaltic residue and a hydrocarbon solvent, blending of the ingredients occurs merely by contact therebetween and by virtue of the temperature differential resulting in a reaction during the flow of the ingredients through a baffled mixing chamber of a specified length and diameter. In connection with other types of ingredients and products such as fuel, oils, bituminals, etc., additional physical mixing would probably be necessary during flow of the ingredients through the mixing chamber. It will therefore be appreciated that in connection with the type of ingredients involved, a calibrated temperature chart may be prepared in connection with particularly dimensioned apparatus in order to practice the method of the present invention. By use of the calibrated temperature relationship, and observation of the discharge temperature and inlet temperatures of the two ingredients, the flow rate of either ingredient may be controlled in order to maintain the calibrated relationship aforementioned as a result of which a product is produced having the requisite properties. Temperature responsive control means may accordingly be utilized in connection with a control valve for regulating the inlet flow of either ingredient, which control means must necessarily be operative in accordance with the aforementioned pre-calibrated relationship of temperatures.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged partial sectional view of the apparatus illustrated in FIGURE 1.

FIGURE 3 is a partial perspective view of a portion of the apparatus illustrated in FIGURE 2.

Figure 5:
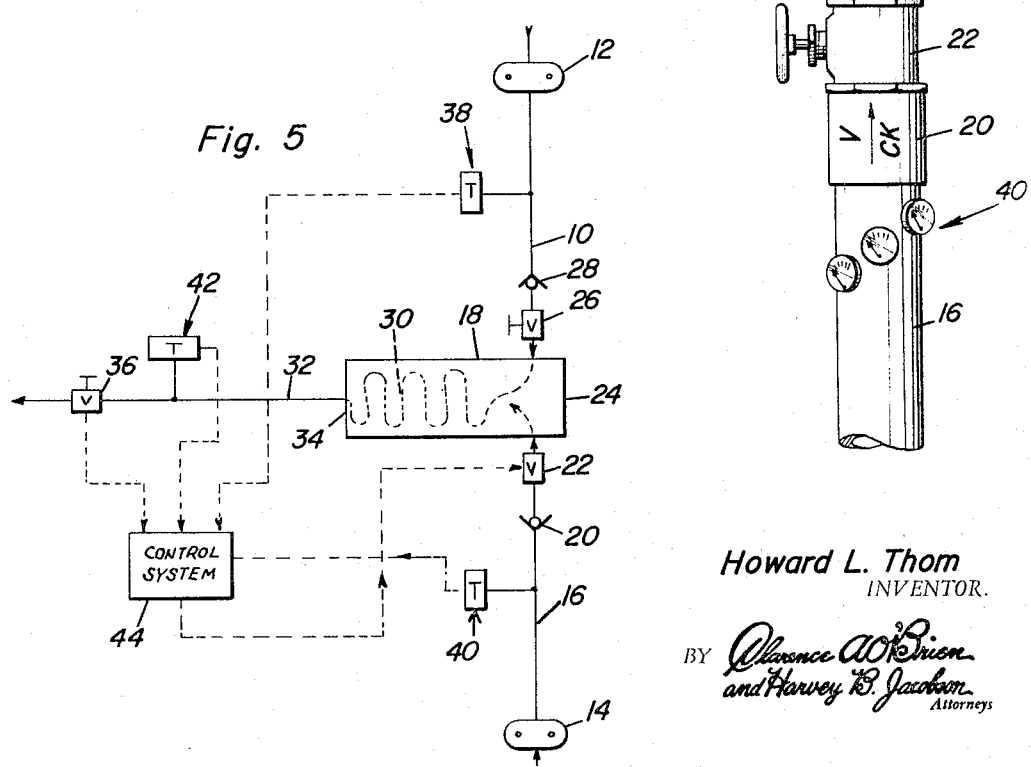
FIGURE 5 is a circuit diagram illustrating the system of the present invention.

The thermal blending method of the present invention although described in connection with fluent asphalt preparations, may also be applicable to the blending of other ingredients. Referring therefore to FIGURE 5 initially, the method of the present invention may be described in connection with the diagrammatically illustrated apparatus for the purpose of producing a product blend of two fluent ingredients the more viscous of which may be heated to an elevated temperature so that it may flow at a constant rate through inlet conduit 10 when discharged from some suitable type of positive displacement pump 12. A second positive displacement pump 14 is similarly utilized for inducing flow of a second ingredient at a different temperature as compared to that of the ingredient flowing through the inlet viscosity conduit 10. The second ingredient is therefore discharged into the inlet conduit 16 and introduced into the mixing tank or chamber 18 through a one-way check valve 20 and a flow regulating valve 22. Axially aligned adjacent the end 24 of the mixing tank 18, is the inlet valve 26 for the more viscous heated ingredient flowing within the inlet conduit 10 through the one-way check valve 28. The fluent ingredients respectively introduced through the conduits 10 and 16, are therefore conducted in a baffle flow path as shown by dotted lines 30 for a predetermined distance within the mixing tank 18 and discharged through an outlet conduit 32 connected to the end 34 of the mixing tank. An outlet control valve 36 is therefore also provided in the outlet conduit 32 through which the blended product is obtained at some useful temperature intermediate the temperature of the ingredients as introduced. Associated with each of the conduits 10, 16 and 32, are temperature indicating arrangements 38, 40 and 42. In this manner observation of the temperature of the more viscous heated ingredient in the conduit 10, and the temperature of the product in the outlet conduit 32, may be utilized for regulating the flow rate of the less viscous ingredient so as to maintain a certain relationship between the product temperature and the inlet temperature of the heated ingredient by virtue of which the desired property of the product is obtained. Accordingly, some control system 44 may be utilized in accordance with the foregoing.

One of the most important aspects of the present invention is the discovery that the viscosity property of blended preparations such as fluent asphalt, as described for example by "The Asphalt Institute" and set forth in "Specification for Asphalt Cement and Liquid Asphalt" (specification series No. 3), 3rd edition, January 1962, may be obtained by temperature observations of a heated asphalt residue ingredient and the product temperature, the flow rate of the hydrocarbon solvent or "cutback" being controlled in order to maintain a pre-calibrated relationship between the aforementioned temperatures. An example of calibrated temperature relationships obtained in connection with rapid curing type of liquid asphalt, is set forth in the following chart.

CHART NO. 1

Rapid curing type of liquid asphalts (using 60° F. "cutback")

| Liquid Asphalt Grade | Discharge Temperatures (° F.) of Liquid Asphalt | | | | | |
|---|---|---|---|---|---|---|
| | RC-0 | RC-1 | RC-2 | RC-3 | RC-4 | RC-5 |
| Furol Viscosity | 75-150 | 75-150 | 100-200 | 250-500 | 125-250 | 300-600 |
| | 77° F. | 122° F. | 140° F. | 140° F. | 180° F. | 180° F. |
| Elevated Inlet Temp. (° F.) of Heated Asphalt Residue: | | | | | | |
| 250 | 180 | 195 | 210 | 217 | 228 | 238 |
| 275 | 198 | 215 | 231 | 239 | 251 | 262 |
| 300 | 216 | 234 | 252 | 260 | 274 | 285 |
| 325 | 234 | 254 | 273 | 282 | 297 | 309 |
| 350 | 252 | 273 | 294 | 303 | 320 | 333 |

It will be observed that the asphalt residue heated to an elevated inlet temperature ranges between 250 degrees Fahrenheit and 350 degrees Fahrenheit necessary to obtain the blended product at a temperature which will be high enough for use in connection with road surfacing or paving purposes.

A similar example of calibrated temperature relationships in connection with medium curing type of liquid asphalt has also been obtained and is set forth as follows:

CHART NO. 2

Medium curing type of liquid asphalts (using 60° F. "cutback")

| Liquid Asphalt Grade | Discharge Temperatures (° F.) of Liquid Asphalt | | | | | |
|---|---|---|---|---|---|---|
| | MC-0 | MC-1 | MC-2 | MC-3 | MC-4 | MC-5 |
| Furol Viscosity | 75-150 | 75-150 | 100-200 | 250-500 | 125-250 | 300-600 |
| | 77° F. | 122° F. | 140° F. | 140° F. | 180° F. | 180° F. |
| Elevated Inlet Temp. (° F.) of Heated Asphalt Residue: | | | | | | |
| 250 | 168 | 198 | 208 | 215 | 230 | 238 |
| 275 | 184 | 217 | 228 | 236 | 253 | 262 |
| 300 | 201 | 237 | 249 | 258 | 276 | 285 |
| 325 | 217 | 257 | 270 | 278 | 299 | 309 |
| 350 | 235 | 277 | 291 | 300 | 322 | 333 |

Figure 4:
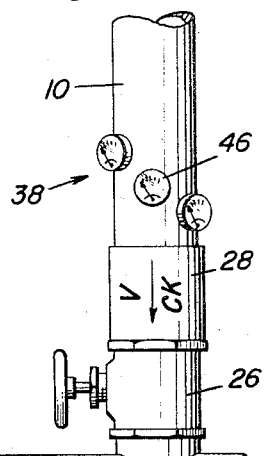
FIGURE 4 is a transverse sectional view taken subtantially through a plane indicated by section line 4—4 in FIGURE 2.
Figure 1:
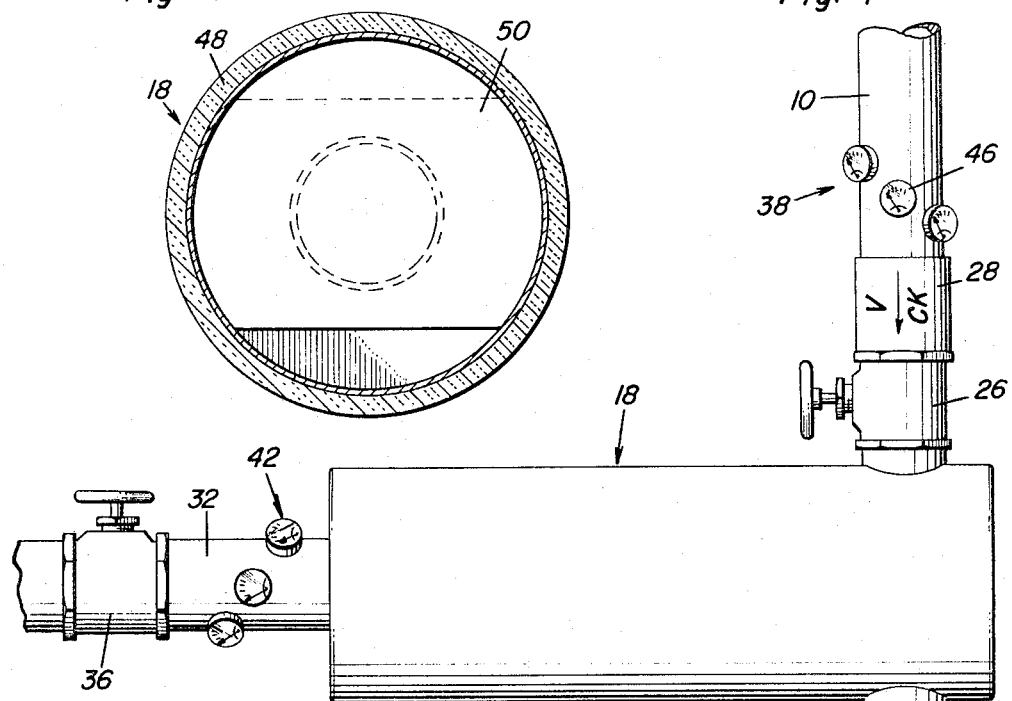
FIGURE 1 is a top plan view of apparatus utilized in accordance with the method of the present invention.

These charts are merely exemplary and, of course, may be made more complete with respect to temperature values intermediate those given. Also, it will be appreciated that the calibrated information was obtained in connection with specifically dimensioned apparatus. Thus, the test apparatus with which the aforementioned charted data was obtained involves the use of an inlet conduit 10 equal in diameter to a four inch diameter inlet conduit 16 as shown in FIGURES 1 and 2 and a mixing tank or chamber 18 having an eight inch diameter and being eight feet long including at least three baffles mounted therewithin.

Referring now to FIGURES 1, 2, 3 and 4, typical apparatus is illustrated for producing the liquid asphalt product more specifically described hereinbefore. The inlet conduit 10 as will be observed from FIGURE 1, includes three temperature indicating devices 46 in the arrangement 38 mounted in spaced relation so as to obtain an accurate average temperature indication of the heated ingredient flowing through the conduit 10, the check valve 28 and the manually operated control valve 26. A similar temperature indicating arrangement 40 is disposed on the inlet conduit 16 through which the less viscous ingredient or "cutback" is introduced into the mixing tank 18. As more clearly seen in FIGURES 2 and 3, the mixing tank 18 includes insulation 48 and defines therewithin a mixing flow chamber having a plurality of baffle members 50. The ingredients will therefore flow in the baffle path aforementioned for complete mixing, blending and reaction so as to produce the product in the discharge conduit 32. It will be observed that the inlet conduits 10 and 16 are axially aligned with each other and in the case of ingredients that do not require any additional physical mixing procedure, the less viscous ingredient may be introduced through a plurality of jet discharge tubes 52 of different axial length so as to better distribute the less viscous ingredient within the other ingredient for mixing and reaction purposes. Thus, upon opening of the discharge valve 36, the blended product will flow through the outlet conduit 32 and the temperature thereof may be observed by means of the temperature indicating arrangement 42.

Use of the described apparatus under manual control pursuant to the principles of the present invention will be apparent. For example, in connection with a desired blend, the valve 26 will be opened completely so that a constant flow of the heated, more viscous ingredient is introduced into the mixing chamber 18 by the conduit 10 and the temperature thereof noted on the temperature indicating arrangement 38. The control valve 22 will then be opened part way so as to admit a controlled flow of the less viscous ingredient at a reduced temperature which will be noted on the temperature indicating arrangement 40. Upon opening of the discharge valve 36, the temperature of the product will be noted on the temperature indicating arrangement 42. The control valves 26, 22 and 36 may then be adjusted until the temperature of the product in the outlet conduit 32 will fall within the useful range required, for example between 168 degrees and 333 degrees in connection with the temperature calibration charts hereinbefore set forth. Then, depending upon the grade and type of product desired, the exact temperature of the heated ingredient within the inlet conduit 10 will be noted by means of the temperature indicating arrangement 38 and the control valve 22 varied until the product temperature as indicated on the temperature indicator 42 indicates the temperature called for in connection with the temperature reading on indicator 38 by use of the calibrated charts as aforementioned. For example, should the inlet temperature of the heated asphalt residue flowing through the conduit 10 be 250 degrees Fahrenheit, and it is desired to obtain a liquid asphalt product of grade RC-0, the control valve 22 through which the cooler "cutback" is admitted, will be adjusted until the product temperature as indicated on the temperature indicator 42 will be 180 degrees Fahrenheit. In this manner, the desired product grade and type may be obtained in a rapid and accurate manner in accordance with specifications prescribed by any authority.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A method of preparing a fluent product of at least two materials consisting of a hydrocarbon solvent and a liquid asphalt having a Furol viscosity which is below 600 at 180° F. to obtain a product having a specified viscosity and curing rate, comprising the steps of: preheating at least one of said materials to reduce the viscosity thereof for inlet flow; regulating the inlet flow of one of said fluent materials at a different inlet temperature relative to the other of said fluent materials; mixing said materials for discharge flow at a resultant temperature; measuring the inlet temperatures of the fluent materials and the resultant temperature of the product and varying the regulated inlet flow of said one of the materials to obtain a calibrated relationship between the measured inlet temperatures of said fluent materials and said resultant temperature of the product under discharge flow.

2. The method of claim 1, wherein the inlet temperature of said liquid asphalt is substantially within the range of 250° to 350° F., and the inlet temperature of said hydrocarbon solvent is 60° F. to produce said product at a resultant temperature above 168° F.

3. The method of claim 1, wherein the inlet temperature of one of said liquid asphalt is substantially within the range of 250° F. to 350° F. and the inlet temperature of the hydrocarbon solvent is 60° F. to produce said product at a resultant temperature above 168° F.

4. Apparatus for preparing a fluent product of at least two ingredients having different viscosities and inlet temperatures comprising a mixing chamber having flow baffles mounted therein, a pair of aligned inlet conduits connected to said mixing chamber adjacent one axial end thereof, a discharge conduit connected to said mixing chamber at the other axial end thereof, control valves connected to each of said conduits to control inlet and outlet flow to and from said chamber, temperature indicating means mounted on said conduits adjacent said control valves for measuring said inlet temperatures and the outlet temperature of the ingredients in the discharge conduit, control means operatively connected to one of said control valves on one of said inlet conduits for varying inlet flow therethrough in accordance with a precalibrated temperature relationship between one of said inlet temperatures and the outlet temperature indicated on said temperature indicating means mounted respectively on the other of said inlet conduits and said outlet conduit, one of said inlet conduits having a plurality of different length jet discharge tubes connected thereto within said mixing chamber.

5. A method of preparing a fluent product of at least two materials consisting of a hydrocarbon solvent and a liquid asphalt having a Furol viscosity which is below 600 at 180° F. to obtain a product having a specified viscosity and curing rate, comprising the steps of: heating the liquid asphalt to reduce the viscosity thereof for inlet flow at a constant rate; regulating the inlet flow of the hydrocarbon solvent at an inlet temperature lower than the inlet temperature of said liquid asphalt; mixing said materials for discharge flow at a resultant product temperature; and varying the regulated inlet flow of said solvent to obtain a calibrated relationship between said inlet temperature of said liquid asphalt and the product temperature of the product under discharge flow.

6. A method for preparing a product in a fluent state for curing to a solid state at a desired rate and to a desired grade of physical property comprising the steps of: establishing a constant flow of one fluent ingredient at an inflow temperature, introducing a second ingredient at a controllable flow rate for mixing with said one ingredient, said second ingredient having a lower viscosity than said one ingredient and a lower predetermined inlet temperature; calibrating the inflow temperatures of said one ingredient with temperatures of the product in said fluent state for different curing rates and product grades; recording the calibrated temperatures in chart form; observing the inflow temperature of said one ingredient; and varying the controllable flow rate of said second ingredient until a recorded calibrated product temperature is obtained corresponding to said observed inflow temperature for a desired curing rate and product grade.

7. A method of preparing an asphaltic composition from a liquid asphalt having a Furol viscosity less than 600 at 180° F. and a hydrocarbon curing solvent for curing to a hardened state from a resultant fluent product temperature comprising the steps of: selecting a product temperature range for an asphaltic composition having desired viscosity and curing properties between temperature limits of 168° F. and 333° F., preheating the liquid asphalt to an inlet temperature within a range of 250° F. to 350° F.; mixing said heated asphalt with said hydrocarbon curing solvent at a temperature of 60° F.; and controlling the proportion of asphalt mixed with the solvent until a precalibrated temperature relationship is obtained between said inlet temperature and a fluent product temperature within the selected product temperature range.

8. The process of preparing a fluent composition containing a liquid asphaltic having a Furol viscosity which is less than 600 at 180° F. and a curing solvent comprising the steps of: preheating the asphalt to a variable inlet temperature substantially above its softening point to support continuous flow thereof; adding to the heated asphalt the solvent at a predetermined temperature substantially below the inlet temperature of the asphalt; measuring the variable inlet temperature of the asphalt and the resultant temperature following mixing thereof with the solvent; and varying the proportion of solvent added to the asphalt until a precalibrated relationship is obtained between the measured inlet and resultant temperatures corresponding to a fluent composition having a desired curing rate and viscosity.

9. The process of claim 8 wherein said inlet temperature is variable within a range of 250° F. to 350° F. and the predetermined temperature of the solvent to 60° F.

References Cited by the Examiner

UNITED STATES PATENTS

| | | | |
|---|---|---|---|
| 390,960 | 10/1888 | Gustin | 137—90 |
| 531,984 | 1/1895 | Upham | 106—279 |
| 2,249,412 | 7/1941 | Yeager | 106—278 |
| 2,383,097 | 8/1945 | Weetman | 106—278 |
| 2,415,913 | 2/1947 | Schmidt | 137—90 |
| 2,558,962 | 7/1951 | Kempton | 137—90 XR |
| 3,025,232 | 3/1962 | Jones | 137—4 XR |

FOREIGN PATENTS

| | | |
|---|---|---|
| 525,225 | 5/1956 | Canada. |
| 131,588 | 8/1919 | Great Britain. |

ALEXANDER H. BRODMERKEL, *Primary Examiner.*

ISADOR WEIL, MORRIS LIEBMAN, *Examiners.*

A. J. JAFFE, J. B. EVANS, *Assistant Examiners.*